(12) United States Patent
Mitchell et al.

(10) Patent No.: US 7,895,706 B2
(45) Date of Patent: Mar. 1, 2011

(54) SURFACE TREATING HEAD ASSEMBLY

(75) Inventors: Andrew Martin Mitchell, Malmesbury (GB); Clive James Frederickson, Malmesbury (GB)

(73) Assignee: Dyson Technology Limited, Wiltshire (GB)

( * ) Notice: Subject to any disclaimer, the term of this patent is extended or adjusted under 35 U.S.C. 154(b) by 0 days.

(21) Appl. No.: 12/694,793

(22) Filed: Jan. 27, 2010

(65) Prior Publication Data

US 2010/0205769 A1    Aug. 19, 2010

(30) Foreign Application Priority Data

Feb. 4, 2009    (GB) ................................. 0901774.0

(51) Int. Cl.
*A47L 5/00*    (2006.01)
(52) U.S. Cl. ............................ 15/319; 15/339; 15/368
(58) Field of Classification Search .................. 15/319, 15/339, 368, 41.1
See application file for complete search history.

(56) References Cited

U.S. PATENT DOCUMENTS

| | | | | |
|---|---|---|---|---|
| 4,171,554 A | * | 10/1979 | Tschudy ....................... | 15/359 |
| 6,081,963 A | * | 7/2000 | Jailor et al. ................... | 15/368 |
| 6,351,872 B1 | * | 3/2002 | McCormick .................. | 15/334 |
| 7,203,993 B2 | * | 4/2007 | Tondra et al. ................. | 15/362 |
| 7,316,051 B2 | * | 1/2008 | Budd ........................... | 15/361 |
| 2005/0218713 A1 | | 10/2005 | Moshenrose | |

FOREIGN PATENT DOCUMENTS

EP    0887468    12/1998

OTHER PUBLICATIONS

GB Search Report dated Apr. 28, 2009, directed to counterpart GB Application No. 0901774.0; 2 pages.

* cited by examiner

*Primary Examiner*—Dung Van Nguyen
(74) *Attorney, Agent, or Firm*—Morrison & Foerster LLP

(57) ABSTRACT

A surface treating head assembly for an appliance such as a vacuum cleaner includes a head and a drivable agitator in the form of a brush bar, rotatably housed in a housing. A motor is arranged to drive a mechanism, such as cams arranged to adjust the position of the brush bar with respect to the housing. An electro-mechanical feedback arrangement, which may include an actuator, is arranged to bear against microswitches to control operation of the motor. Different faces of the actuator are arranged to act against different ones of the microswitches in accordance with different positions of the brush bar. The height of the brush bar is selectively controllable between the predetermined positions, such that the depth of penetration of the bristles of the brush bar may be optimized for different types of carpet.

12 Claims, 12 Drawing Sheets

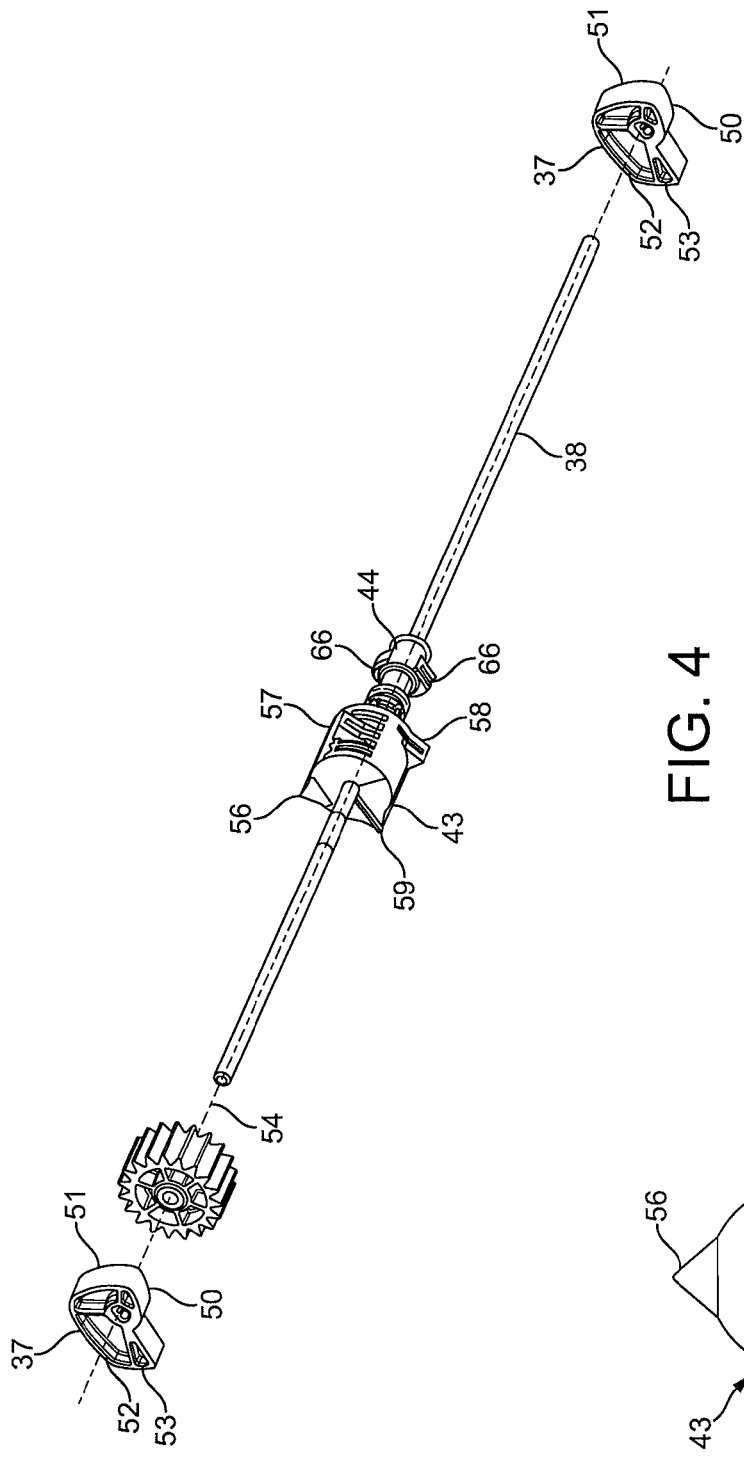
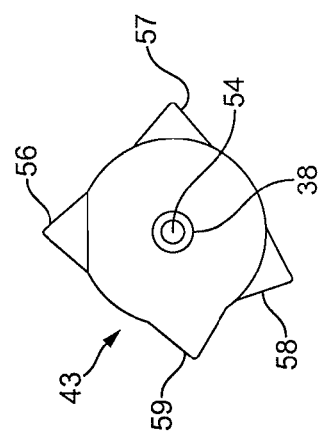
FIG. 4
FIG. 4a

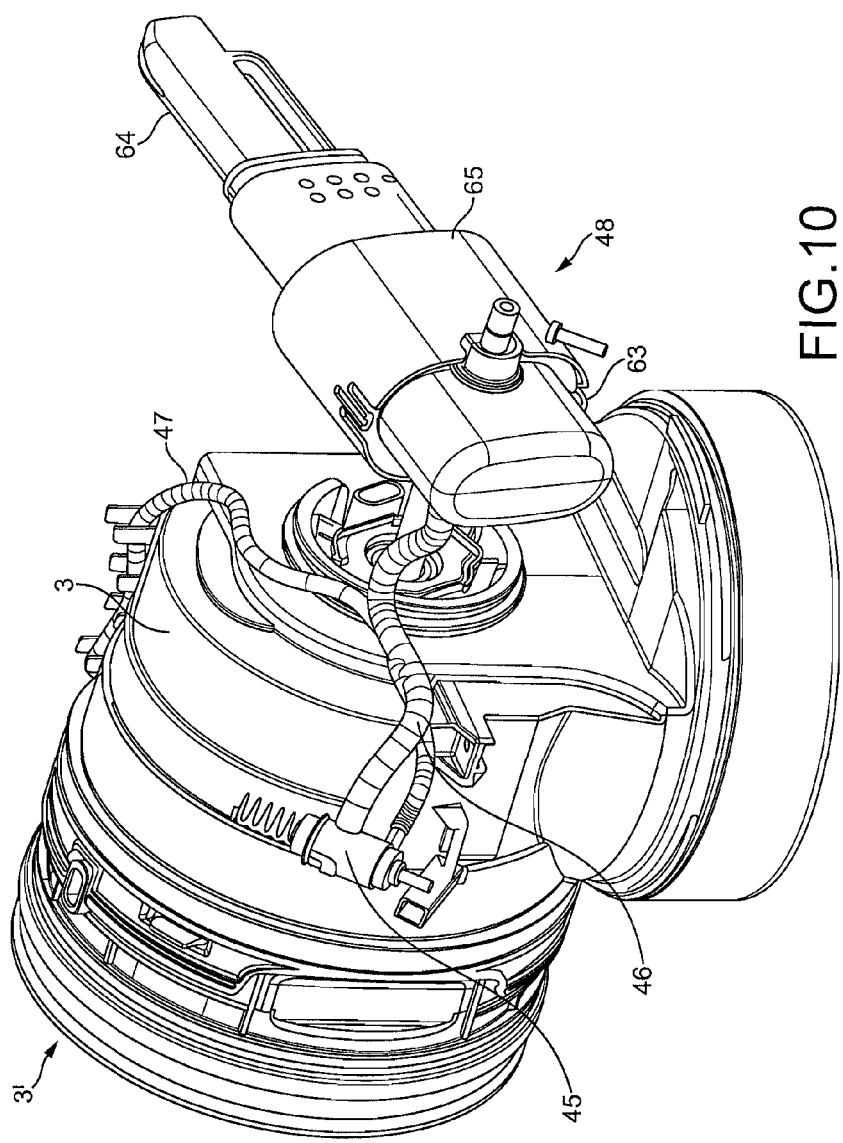

SURFACE TREATING HEAD ASSEMBLY

REFERENCE TO RELATED APPLICATIONS

This application claims the priority of United Kingdom Application No. 0901774.0, filed Feb. 4, 2009, the entire contents of which are incorporated herein by reference.

FIELD OF THE INVENTION

The present invention relates to a surface treating head assembly for a surface treating appliance such as a vacuum cleaner.

BACKGROUND OF THE INVENTION

An upright vacuum cleaner typically comprises a main body containing dirt and dust separating apparatus, a cleaner head pivotably mounted on the main body and having a dirty air inlet, and a motor and fan unit for drawing dirty air into the dirt and dust separating apparatus via the dirty air inlet so that dirt and dust can be separated from the airflow before the clean air is expelled to the atmosphere. The dirty-air inlet or suction opening through which dirty air is sucked into the vacuum cleaner is directed downwardly so that it faces the floor to be cleaned. The dirt and dust separating apparatus can take the form of a filter, a filter bag or a cyclonic arrangement.

A brush bar may be provided in the dirty air inlet so that it protrudes to a small extent from the inlet. The brush bar is activated mainly when the vacuum cleaner is used to clean carpeted surfaces. The brush bar comprises an elongate cylindrical core from which bristles extend along its length in a radial direction. Rotation of the brush bar causes the bristles to sweep along the surface of the carpet to be cleaned to loosen dirt and dust and pick up debris. The suction of air causes air to flow around the brush bar and underneath it to help lift the dirt and dust from the surface to be cleaned and then carry it from the dirty air inlet or suction opening to the dirt and dust separating apparatus.

The effectiveness of an upright vacuum cleaner depends upon the amount of dirt and dust which can be picked up by the cleaner head and passed to the separation apparatus, and so it is important that the cleaner head maintains good contact with the surface being cleaned and that the bristles of the brush bar penetrate the fibres of the carpet.

It has been proposed to employ a brush bar that can move vertically with respect to the cleaner head so that the bristles of the brush bar protrude through the suction inlet to a greater or lesser degree. However, in order for this arrangement to be useful, the range of positions of the brush bar must be controllable so that the brush bar assumes an efficacious position for each type of carpet or floor surface.

SUMMARY OF THE INVENTION

The invention provides a surface treating head assembly comprising a drivable agitator rotatably housed in a housing, a motor arranged to be capable of driving a mechanism arranged to adjust the position of the agitator with respect to the housing and an electro-mechanical feedback arrangement for controlling operation of the motor.

The provision of a motor controlled by an electro-mechanical feedback arrangement permits a variety of agitator positions to be achieved, which positions may be arranged to correspond to desirable depths of penetration of the agitator bristles for different types of carpet.

Preferably, the electro-mechanical feedback arrangement comprises an actuator arranged to interact with a signalling system associated with control circuitry for the motor. The actuator provides a direct mechanical link between the position-adjusting mechanism and the signalling system for the control circuitry.

Advantageously, the actuator is in communication with the mechanism arranged to adjust the position of the agitator, and so provides feedback based on the actual position of the agitator. This is advantageous over a system employing, for example, electronic sensors, which could supply false signals to the control circuitry.

The position-adjusting mechanism may comprise at least one cam, with the cam and the actuator being rotatably drivable together by the motor about a common axis. The cam or cams and actuator may be located on a common rod, which is rotatably driven by the motor. The cam may be arranged to act on a lever associated with the agitator, and so convert the rotational movement of the cam into vertical movement of the agitator.

Advantageously, the signalling system comprises at least one switch (and preferably a plurality of switches) arranged, in use, to be actuated by at least one portion of the actuator, such as a protruding face or faces on the actuator. The faces of the actuator may be arranged to act on different ones of the switches in predetermined configurations.

Preferably, the position-adjusting mechanism is arranged to adjust the position of the agitator to a plurality of predetermined vertical positions. The electro-mechanical feedback arrangement may be arranged to adopt predetermined configurations associated with different ones of the predetermined vertical positions. As mentioned above, the faces of the actuator may be arranged to act on different ones of the switches in predetermined configurations so as to provide a direct and positive electro-mechanical feedback, which is less prone to error than a feedback system employing sensors.

Energisation of the motor may be controlled by a user-operable switch assembly comprises several user-operable buttons corresponding to different predetermined positions of the agitator.

BRIEF DESCRIPTION OF THE DRAWINGS

The invention will now be described, by way of example, with reference to the accompanying drawings, in which:

FIG. 4 is a perspective partly exploded view of part of the head assembly of FIG. 3;

FIG. 4a is a side view of one of the parts shown in FIG. 4;

FIG. 10 is a rear perspective view of the motor and piston assembly of the surface-treating appliance, with the piston assembly in its first position;

DETAILED DESCRIPTION OF THE INVENTION

Figure 1:
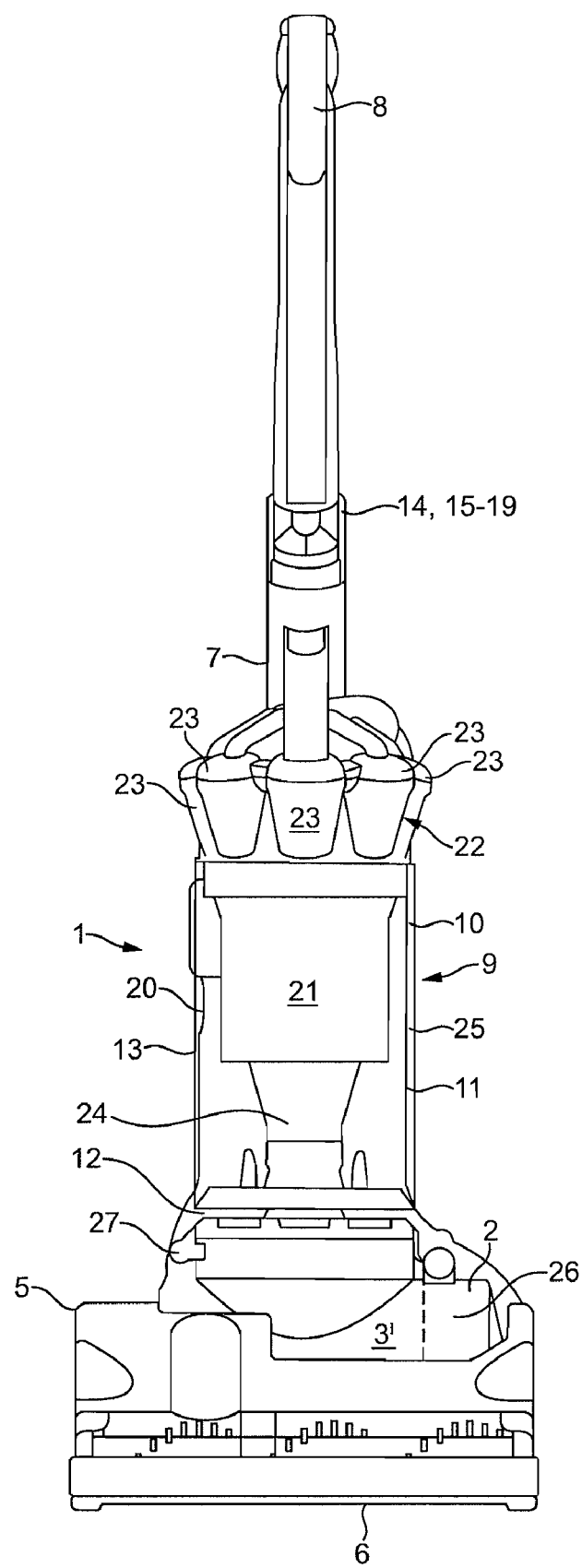
FIG. 1 is a front view of a surface treating appliance incorporating a head assembly constructed according to the invention.

Like reference numerals refer to like parts throughout the specification.

Figure 2:
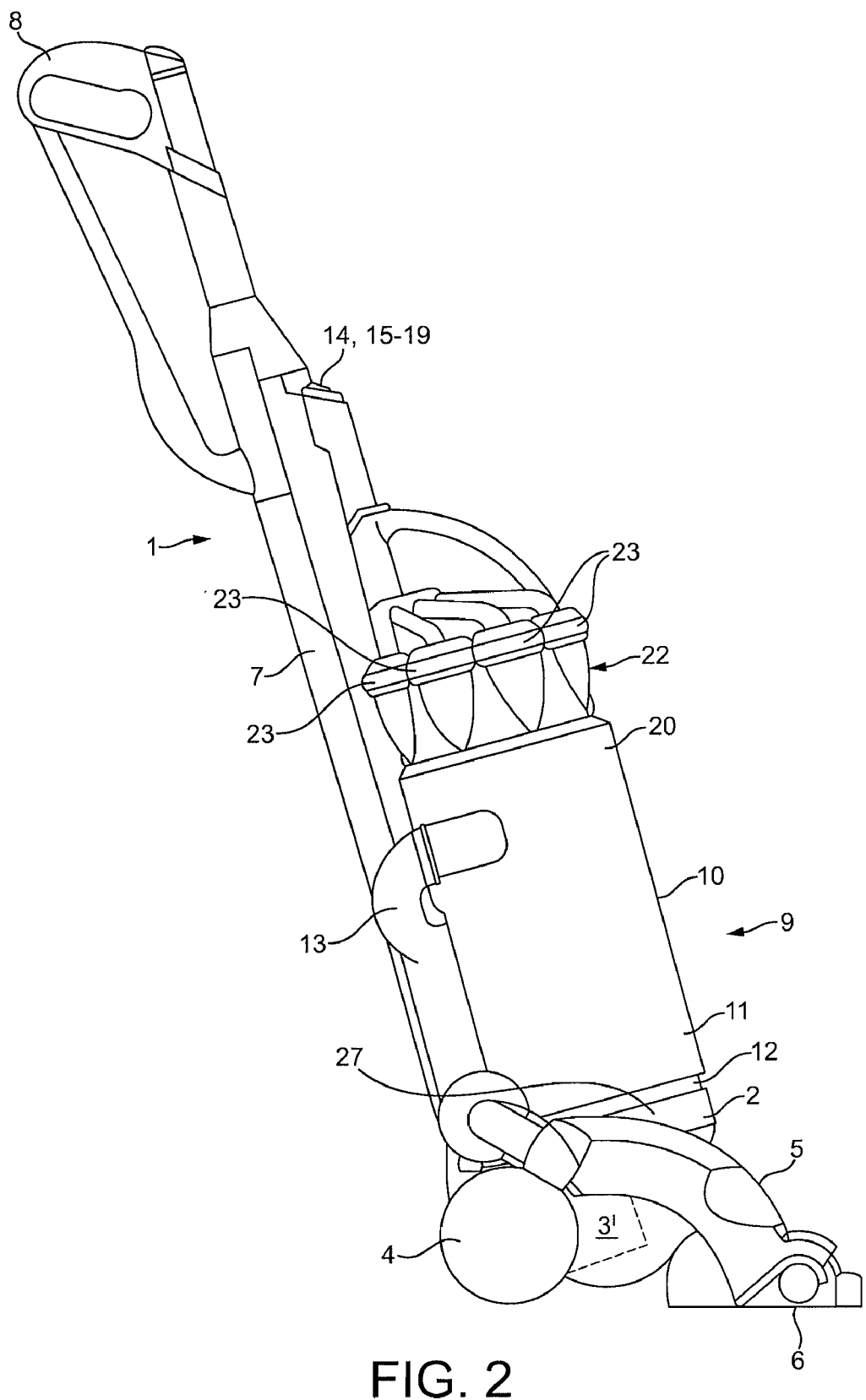
FIG. 2 is a side view of the appliance of FIG. 1 in a mode of use.

With reference to FIGS. 1 and 2, a surface treating appliance in the form of an upright vacuum cleaner is shown and indicated generally by the reference numeral 1. The vacuum cleaner 1 comprises a main body 2 which includes a main motor 3 housed in a motor and fan unit 3' and a pair of wheels 4. A surface treating head assembly in the form of cleaner head assembly 5 is pivotably mounted on the lower end of the main body 2 and a dirty air inlet 6 is provided in the underside of the cleaner head assembly 5 facing the floor surface. The main body 2 further includes a spine 7 which extends vertically upward and merges into a hand grip 8. The hand grip 8 can be manipulated by a user to manoeuvre the vacuum cleaner 1 across a floor surface. FIG. 2 shows the upright vacuum cleaner 2 being used to clean a floor surface. The main body 2 has been reclined by the user, who employs the hand grip 8 to manoeuvre the vacuum cleaner back and forth across the floor.

Separating apparatus 9 is releasably held on the main body 2 of the vacuum cleaner 1. The separating apparatus 9 comprises a separator 10 and a collecting chamber 11. The separating apparatus 9 is supported adjacent the spine 7 on the main body 2 above outlet ports 12 for exhausting air from the vacuum cleaner 1. The interior of the separating apparatus 9 is in communication with the dirty air inlet 6 through ducting 13 adjacent the spine 7. The separating apparatus 9 can be removed from the main body 2 for emptying and for maintenance.

A panel 14 of user operable buttons 15 to 19 is provided on the spine 7 of the cleaner, between the handgrip 8 and the separating apparatus 9. The buttons 15 to 19 enable the user to energise and de-energise the main motor 3 and to control various aspects of the cleaning operation.

In use, the motor and fan unit 3' draws dirty air into the vacuum cleaner 1 via the dirty air inlet 6. The dirty air is carried to the separating apparatus 9 via the ducting 13 adjacent the spine 7. The separating apparatus 9 includes an upstream cyclone 20 in the collecting chamber 11. Incoming air is encouraged to follow a helical path around the interior of the upstream cyclone 20, which causes dirt and dust to be separated from the airflow.

A shroud 21 is located in the upstream cyclone 20. The shroud 21 comprises a cylindrical wall having a plurality of through-holes. The shroud 21 provides a communication path between the upstream cyclone 20 and a downstream cyclone assembly 22.

The downstream cyclone assembly 22 comprises a plurality of downstream cyclones 23 arranged in parallel. Each downstream cyclone 23 is in communication with a downstream collector 24 forming part of the collecting chamber 11. Each of the downstream cyclones 23 has a diameter smaller than that of the upstream cyclone 20. Therefore, the downstream cyclones 23 are able to separate smaller particles of dirt and dust from the partially-cleaned airflow than the upstream cyclone 20. Separated dirt and dust exits the downstream cyclones 23 and passes into the downstream collector 24.

Cleaned air then flows back up through the downstream cyclones 23 and enters a duct 25. The cleaned air then passes from the duct 25 sequentially through a pre-motor filter 26, the motor and fan unit 3', and a post-motor filter 27 before being exhausted from the vacuum cleaner 1 through the outlet ports 12.

Figure 3:
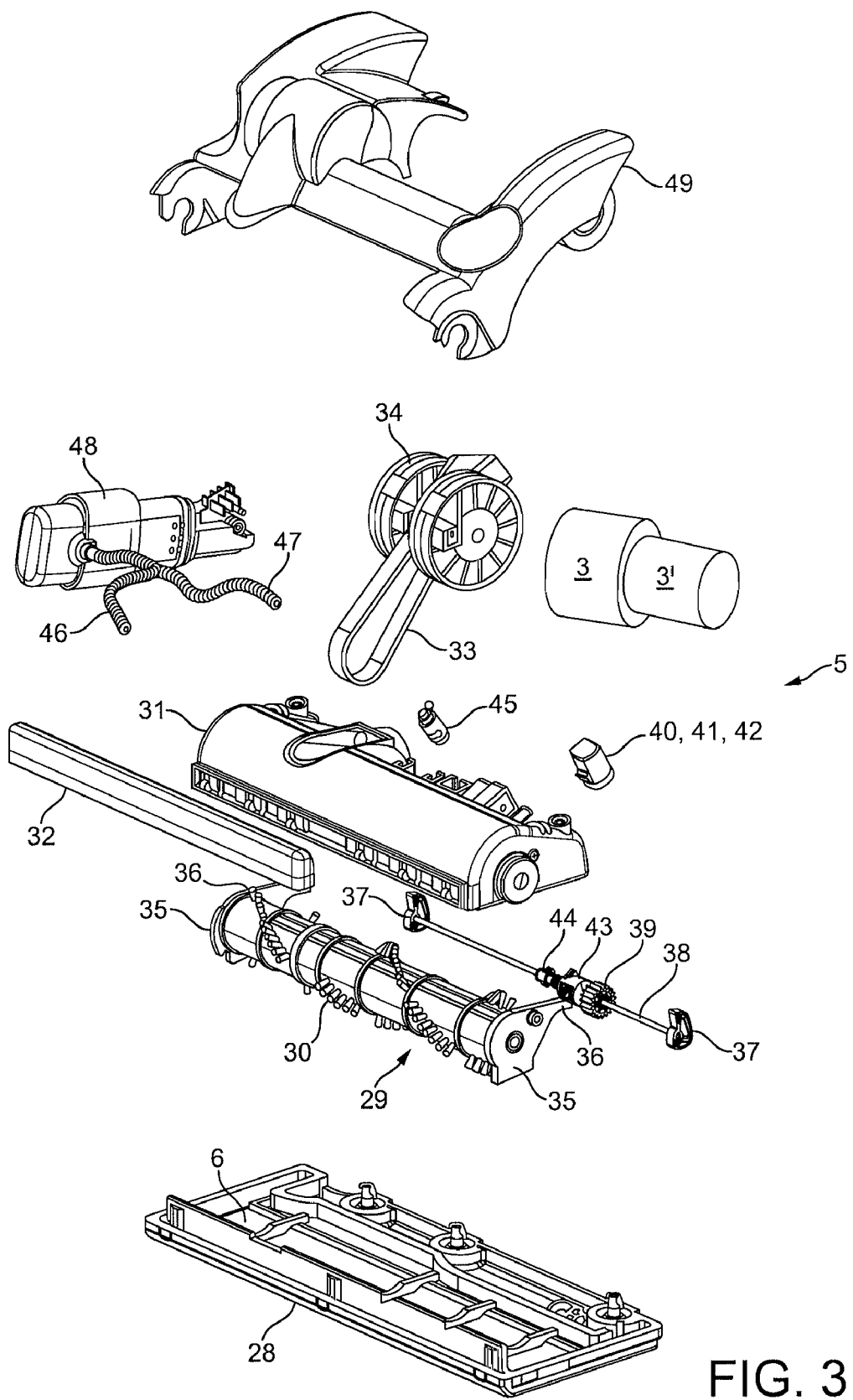
FIG. 3 is an exploded view of parts of the head assembly of the appliance of FIGS. 1 and 2.

FIG. 3 is an exploded view of the head assembly 5 of the vacuum cleaner 1. Certain parts, such as seals, fasteners and parts of the casing have been omitted for clarity. The main components of the head assembly 5 will be introduced in this part of the specification, and their operation and interaction will be described later.

The base of the cleaner head assembly 5 comprises a sole plate 28, which is arranged to engage with a floor surface in use. The sole plate 28 includes an opening that is the dirty air inlet 6.

An agitator in the form of a brush bar 29 is rotatably arranged in the cleaner head assembly 5. The brush bar 29 comprises an elongate cylinder that extends across almost the full width of the dirty air inlet 6. The brush bar 29 has a pattern of tufts of bristles 30 arranged in a helical pattern on its outer surface. The brush bar 29 may be arranged to extend through the dirty air inlet 6 so that, in use, its bristles 30 engage with carpet fibres, thereby helping to dislodge dirt and dust from within the carpet. The brush bar 29 is arranged inside a protective brush bar housing 31. A bumper strip 32 further protects the brush bar 29 from impact with obstacles during use. The brush bar 29 is rotatable by means of a belt 33 driveable by the main motor 3 in the motor and fan unit 3' via a clutch assembly 34.

End caps 35 are arranged at each end of the brush bar 29. The end caps 35 cover the ends of the cylinder and incorporate respective lever arms 36 that protrude towards the rear of the head assembly 5. The lever arms 36 are arranged to engage with respective cams 37. The cams 37 are arranged at the end portions of a cam rod 38 that extends across the head assembly 5, and is parallel with the brush bar 29. The cam rod 38 also has a gear 39 mounted on it, the gear 39 being arranged to be driven by a dedicated cam motor 40 in the head assembly 4, so that the cam rod 38 is rotatable. The cam motor 40 is controlled by control circuitry 41 associated with a microswitch assembly 42. The microswitch assembly 42 is arranged to engage with a microswitch actuator 43 which is also mounted on the cam rod 38.

The cam rod 38 also has a valve actuator 44 affixed to it, which is arranged to engage with a valve 45. The valve 45 is connected, by means of tubing 46, 47 to the main motor 3 that provides suction airflow for the cleaner. The tubing 46, 47 also connects the valve 45 to a piston assembly 48.

These components are arranged inside a cleaner head casing 49, which is pivotably attached to the main body 2 of the vacuum cleaner 1.

FIG. 4 shows the cam rod 38 and its associated components in more detail. Considering first the cam arrangement, each of the cams 37 has a plurality of cam faces 50 to 53. Each cam face 50 to 53 lies in a plane substantially parallel to the rotational axis 54 of the cam rod 38. Each cam face 50 to 53 is a different predetermined distance from the rotational axis 54 of the cam rod 38, so that each cam 37 has an eccentric asymmetric shape. The shape in profile resembles a snail shell. The cams 37 are substantially identical and are arranged at opposite end portions of the cam rod 38 such that they are in substantially the same orientation. In use, the cams 37 are arranged to engage with the lever arms 36 forming part of the end caps 35 of the brush bar 29, as is shown in FIGS. 5a to 5d.

These drawings show the components in various positions in use. The cam rod 38 is arranged in the head assembly 5 such that the cams 37 (only one of which is visible in FIGS. 5a to 5d) always act on the underside of the free end portion 36a of the lever arm 36. The end cap 35 incorporating the lever arm 36 is arranged to be pivotable about a pivot axis 55, such that the brush bar 29 may occupy different vertical positions. Thus, the cam rod 38, the cams 37 and the end caps 35 form a height-adjusting apparatus for the brush bar 29.

Figure 5A:
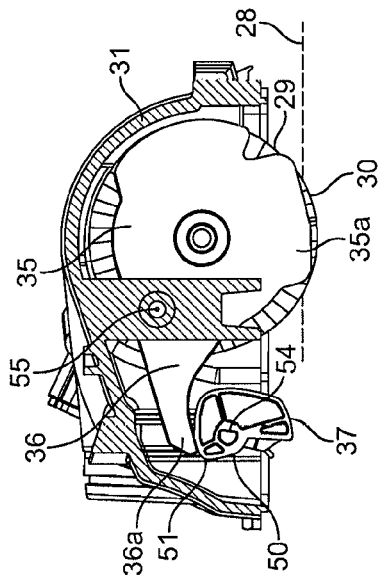
FIGS. 5a to 5d are sectional side view of part of the head assembly in first, second, third and fourth positions respectively.

In FIG. 5a, the components are shown in a first position. In this drawing, the first cam face 50 that is the shortest distance from the cam rod axis 54 is uppermost and acts on the lever arm 36. Thus, the free end 36a of the lever arm is able to pivot downwardly. The end cap 35 pivots upwardly about the pivot axis 55, drawing up the brush bar 29. In this position, the bristles 30 of the brush bar 29 do not protrude through the dirty air inlet 6 of the cleaner head assembly 5.

Figure 5B:
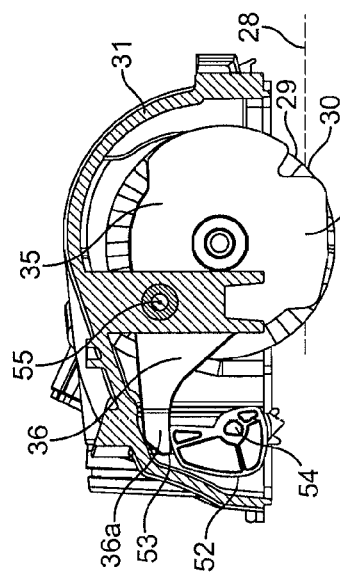

On operation of the dedicated cam motor 40, the cam rod 38 is rotated in order to present a different face of the cam 37 to the lever arm 36. In FIG. 5b, the second cam face 51 that is the second-shortest distance from the cam rod axis 54 is uppermost and acts on the underside of the free end portion 36a of the lever arm 36, urging it upwards a short distance. This causes the brush bar 29 to pivot downwards slightly. The ratio of the lever can be arranged so that movement of the cam 37 to this second position causes the brush bar 29 to move downwardly a predetermined distance, so that a predetermined portion of the bristles 30 protrude through the dirty air inlet 6 in the sole plate 28. In this example, the bristles 30 extend 2 mm below the sole plate 28.

Figure 5C:
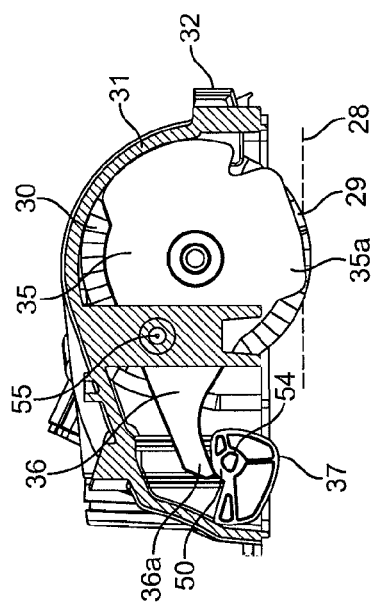

In FIG. 5c, the cam motor 40 has rotated the cam 37 once more, so that the third face 52 is bearing against the free end portion 36a of the lever arm 36, urging it upwards by another predetermined distance. The third face 52 is further from the cam rod axis 54 than the first and second faces 50, 51. This, in turn, forces the brush bar 29 to occupy a lower position with respect to the brush bar housing 31, so that the bristles 30 of the brush bar protrude below the dirty air inlet 6 by another predetermined distance, in this instance 4 mm.

Figure 5D:
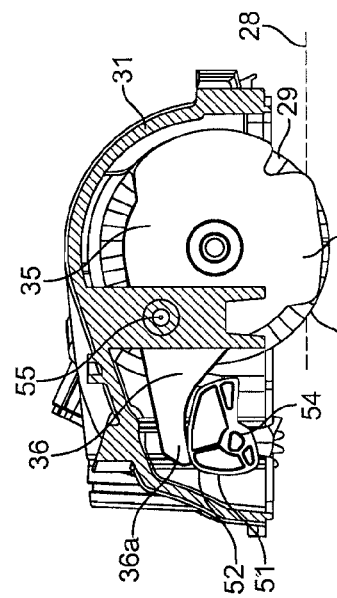

In FIG. 5d, the cam motor 40 has been operated once more to rotate the cam rod 38 so that the fourth face 53 of the cam acts against the underside of the lever arm 36. The fourth face 53 of the cam is the largest distance from the cam rod axis 54 and so causes the free end 36a of the lever arm 36 to move upwards once more. Consequently, the brush bar 29 moves in a downwards direction such that the major portion of its bristles 30 protrude below the sole plate 28 of the cleaner head assembly 5 by another predetermined distance, in this case by 6 mm.

Each end cap 35 includes a protruding portion around part of its circumference, which protruding portion acts as a runner 35a. The runner 35a serves to space the bristles 30 of the brush bar 29 from the floor surface in the event that the user selects a deeper penetration of bristle than the length of fibres of the carpet or rug being cleaned. This is described later in the specification.

A variety of brush bar positions may be employed, each of which is suitable for cleaning a different type of floor surface. For this arrangement to be utilised effectively, the cam motor 40 needs to be controlled so that the positions of the cams 37, and hence the brush bar 29, correspond to the positions desired by the user. The control circuitry 41 associated with the cam motor 40 receives inputs from an electro-mechanical feedback system, which comprises a mechanical actuator interacting with a signalling system. In this embodiment, the electro-mechanical feedback system comprises the microswitch assembly 42 activated by the microswitch actuator 43 mounted on the cam rod 38.

Referring back to FIG. 4 and FIG. 4a, the microswitch actuator 43 comprises a cylindrical member mounted concentrically with the rotational axis 54 of the cam rod 38. The cylindrical member has a plurality of faces 56 to 59 which protrude at a tangent from the outer surface of the cylinder. The microswitch actuator 43 has four faces 56 to 59 in this embodiment. Each face 56 to 59 is arranged at a different position on the circumference of the cylindrical member. Three of the faces 56, 57 and 58 are also spaced axially along the cylindrical member. The fourth face 59 extends for the length of the cylindrical member.

The mechanical microswitch actuator 43 is arranged in a predetermined orientation with respect to the cams 37 on the cam rod 38. Thus, there is a relationship between the rotational position of the microswitch actuator 43 and the afore-described predetermined positions of the cams 37. The microswitch actuator 43 acts on the microswitch assembly 42 to activate the control circuitry 41 and hence control the cam motor 40. In this manner, the cams 37 are caused to occupy the predetermined positions and hence control the vertical position of brush bar 29.

Figure 6:
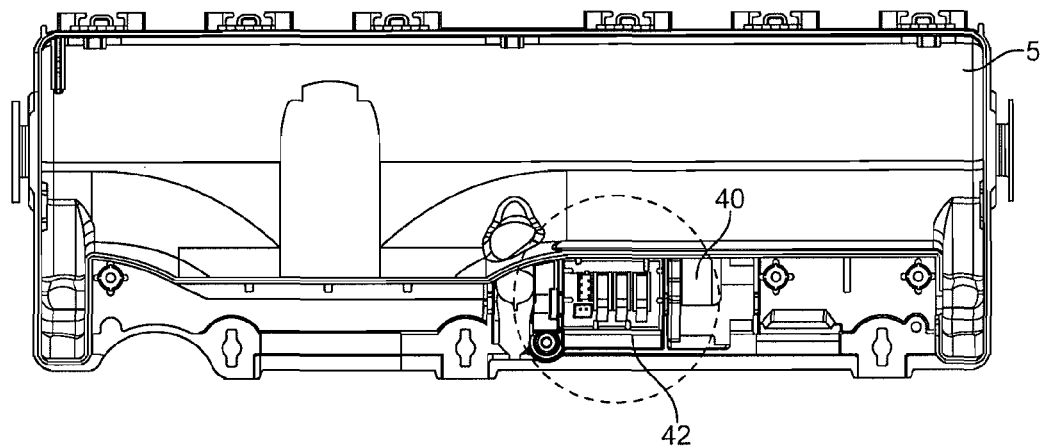
FIG. 6 is a partly cut-away view from underneath of the head assembly.
Figure 6A:
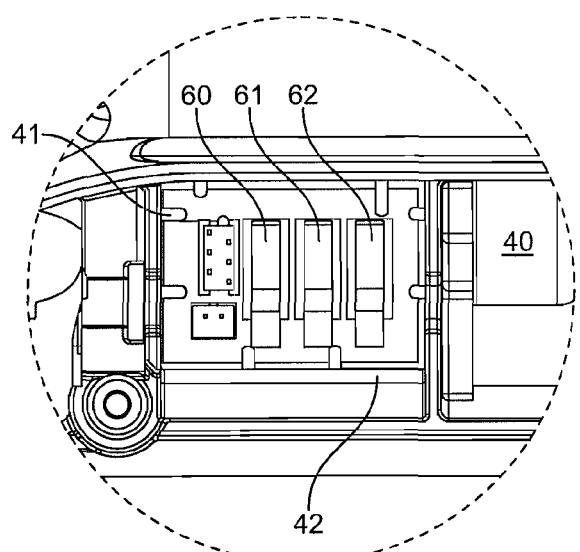
FIG. 6a is a magnified portion of part of FIG. 6.

FIG. 6 is a view from underneath of the cleaner head assembly 5, showing the microswitch assembly 42. The part circled by broken lines is shown in more detail in FIG. 6a. The signalling system formed by the microswitch assembly 42 comprises three microswitches 60, 61, 62 arranged in electrical contact with the control circuitry 41 for the cam motor 40. The microswitches 60, 61, 62 are arranged adjacent one another in the same plane. The spacing between the microswitches 60, 61, 62 corresponds to the spacing between the microswitch actuator faces 56, 57, 58 along the axis of the cylindrical member. As the cam rod 38 rotates, the microswitch actuator faces 56 to 59 are brought into successive engagement with different respective combinations of the microswitches 60, 61, 62. The microswitches 60, 61, 62 send signals to the control circuitry 41, which controls operation of the cam motor 40 in dependence on these signals.

Figure 7:
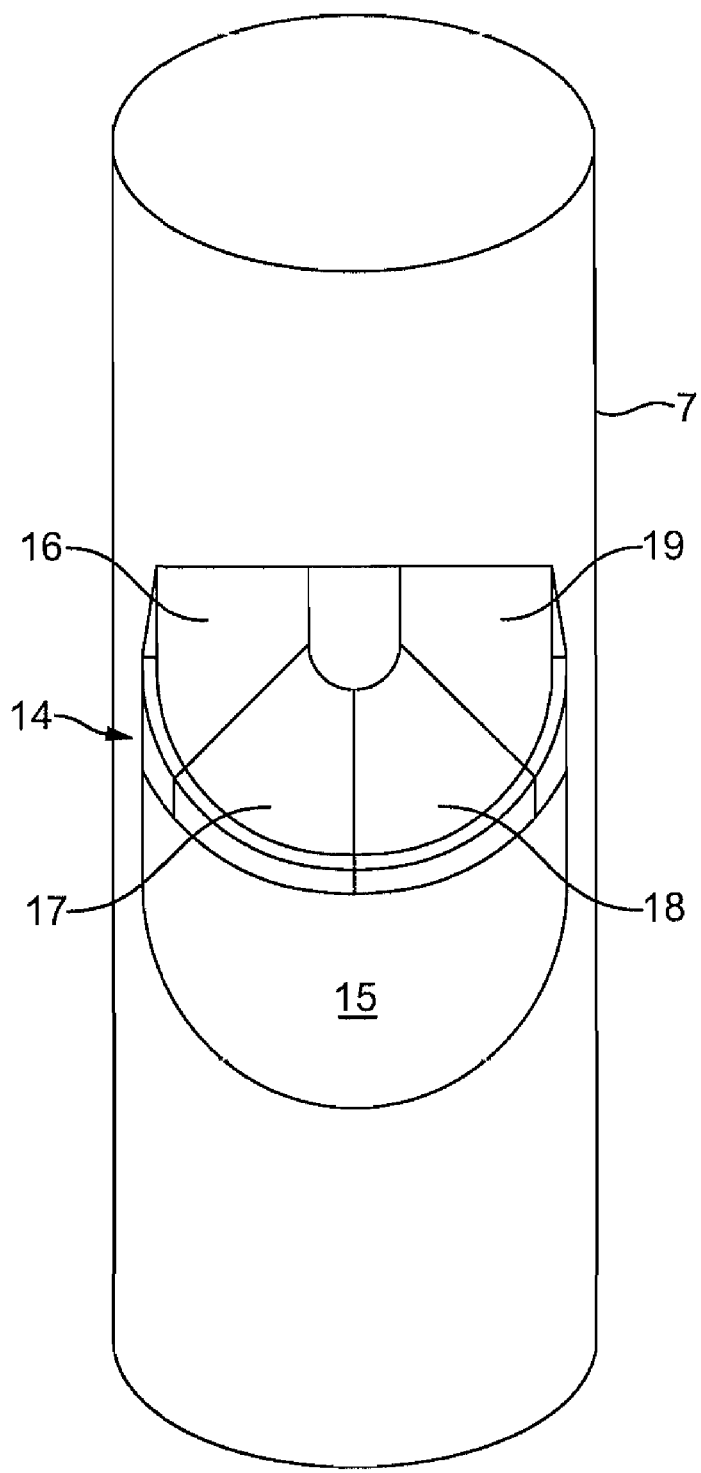
FIG. 7 is a front view of the user-operable switch assembly of the appliance of FIGS. 1 and 2.

The interaction and operation of these components will now be described in use in a typical cleaning operation. FIG. 7 shows the user-operable panel 14 comprising a plurality of buttons 15 to 19. The first and largest button 15 controls energisation of the main motor 3, and is the first button the user depresses when starting a cleaning operation. Thus, the main motor 3 drives the fan to generate a suction airflow.

The remaining buttons 16 to 19 present to the user the option of enhancing the cleaning performance of the vacuum cleaner 1 in accordance with the type of floor being cleaned. The buttons 16 to 19 may be marked with text or symbols indicating different types of floor. If, for example, the user wishes to clean a short pile rug or carpet, the user depresses the button 17 corresponding to that floor type. A switch (not shown) associated with the button 17, sends a signal to the control circuitry 41, which causes the cam motor 40 to rotate the cam rod 38.

For the cleaning of short pile carpets, it is desirable that the bristles 30 of the brush bar 29 protrude from the bottom of the sole plate 28 by a small amount, to engage with the short fibres of the carpet. Thus, the cam motor 40 rotates the cam rod 38, and hence the cams 37, until the cams occupy the position shown in FIG. 5b. The microswitch actuator 43 is arranged so that, when the cams 37 occupy this position, the first face 56 of the microswitch actuator bears against one of the switches 60 of the microswitch assembly 42, as is shown in the schematic drawing of FIG. 8b. This sends a signal to the control circuitry 41 to indicate that the cams 37, and hence the brush bar 29, is in the desired position, and so the cam motor 40 is de-energised.

Figure 8A:
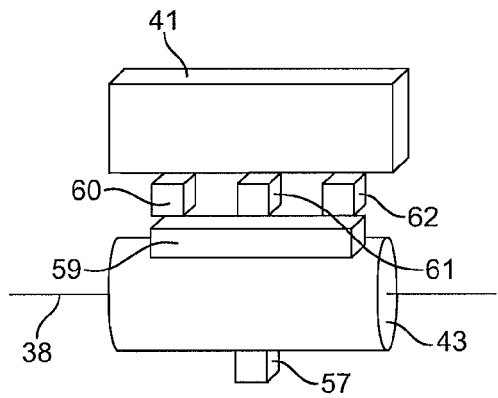
FIGS. 8a to 8d are a schematic diagrams showing operation of parts of the head assembly in the first, second, third and fourth positions respectively.
Figure 8B:
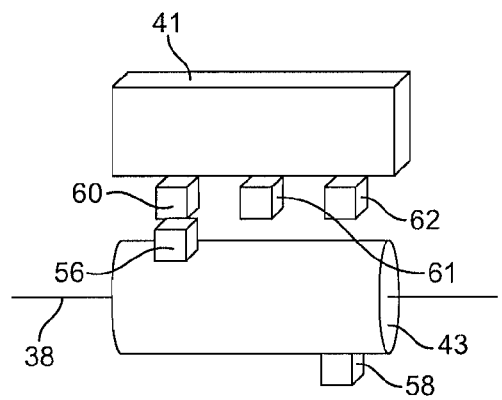
Figure 8C:
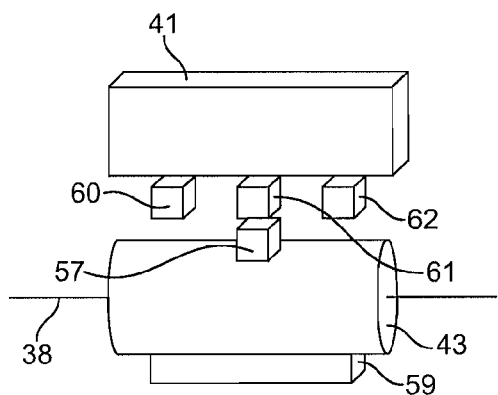
Figure 8D:
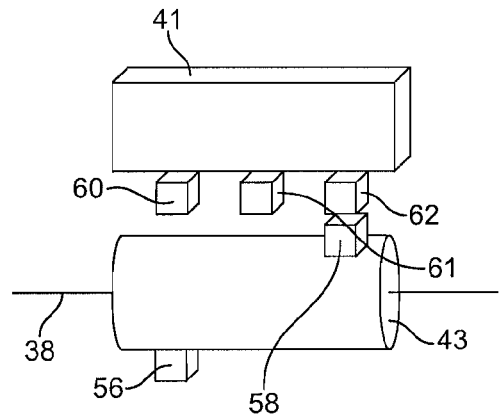

If, however, the user depresses the button 18 corresponding to a floor surface with a medium pile, a corresponding signal is sent to the control circuitry 41 and the cam motor 40 continues to rotate the cam rod 38. When the cams 37 are in the correct position for medium pile carpet cleaning, as is shown in FIG. 5c, the second face 57 of the microswitch actuator 43 bears against the second microswitch 61, as is shown in FIG. 8c. This alerts the control circuitry 41 to the fact that the brush bar 29 is now assuming the correct position for medium pile cleaning, and so the cam motor 40 is de-energised.

If the user depresses the button 19 corresponding to a floor surface with a deep pile, the control circuitry 41 recognises the signal from that button and controls the cam motor 40 to rotate the cam rod 38 until the cams 37 occupy the position shown in FIG. 5d, in which the bristles of the brush bar 29 can penetrate the pile of the carpet the deepest. In this position, the third face 58 of the microswitch actuator bears against the third microswitch 62, so that the control circuitry ceases energising the motor further.

The user can move between different floor types by selecting the corresponding button 16 to 19 to activate the control circuitry 41 accordingly. Thus, the cam motor 40 can be energised to move the cams 37 between the different predetermined positions to enhance cleaning. The microswitch actuator 43 provides a constant feedback of the rotational position of the cam rod 38, so that the control circuitry 41 is able to monitor the position of the cams 37, and hence the brush bar 29 at all times. In this manner, the control circuitry 41 ensures that the position of the brush bar 29 corresponds with that selected by the user.

When the user selects the button 16 corresponding to a bare floor surface, such as floorboards or tiles, the control circuitry 41 is arranged to rotate the cam rod 38 until the brush bar 29 is in its highest position, as shown in FIG. 5a. In this position, the fourth 59 of the microswitch actuator faces bears against the microswitch assembly 42 so as to press against all of the microswitches 60, 61, 62, as shown in FIG. 8a. This tells the control circuitry 41 that the brush bar 29 is at its highest position. In this position, the bristles 30 do not extend below the surface of the sole plate 28 and so are prevented from scuffing the bare floor surface. The brush bar 29 may additionally be prevented from rotating in this position, by means of, for example, a pulley system to disengage the drive belt 33. Of course, any combination of actuator faces 56 to 59 and microswitches 60 to 62 may be employed.

In cleaning medium and deep pile carpets, it is important that the bristles 30 of the brush bar 29 penetrate the carpet fibres. It has been found that, in use, the cleaner head assembly 5 has a tendency to float on the surface of the carpet, so that the bristles 30 do not penetrate as far as is desirable. Thus, when the user operates the buttons 18 or 19 corresponding to medium pile or deep pile carpet, the piston assembly 48 is brought into operation, which piston assembly is arranged to apply a downwardly-directed force to the cleaner head assembly 5.

Figure 9B:
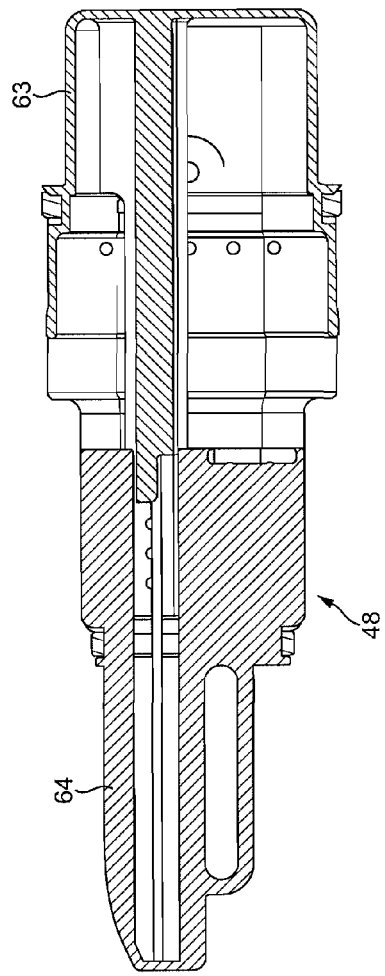
FIG. 9b is a sectional view of the piston assembly in a first position.
Figure 9C:
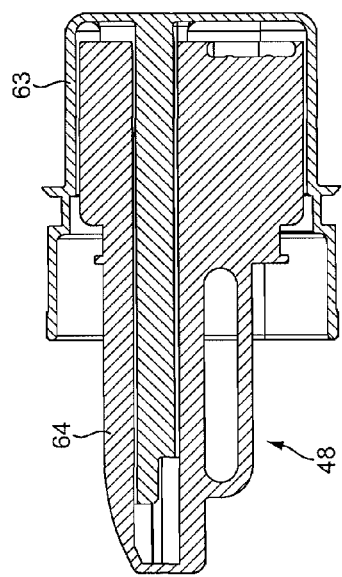
FIG. 9c is a sectional view of the piston assembly in a second position.
Figure 9A:
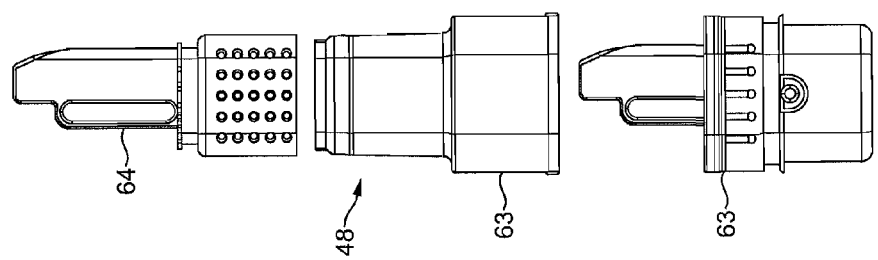
FIG. 9a is an exploded view of the piston assembly of the head assembly.

The piston assembly 48 is shown in more detail in FIGS. 9a to 9c. The piston assembly 48 comprises a cylinder 63 and a piston 64 which is arranged to be slideably moveable into and out of the cylinder. A flexible diaphragm seal 65 is arranged to fit over the cylinder 63 and the piston 64 to prevent air from leaking between these two components, whilst allowing sliding motion. FIG. 9b shows the piston 64 in its normal, extended position and FIG. 9c shows the piston in a contracted position when the piston assembly 48 is activated for medium and/or deep pile carpet cleaning.

FIG. 10 is a rear perspective view of the piston assembly 48 in situ in the cleaner head assembly 5. The piston assembly 48 is connected by a first tube 46 to a valve 45 mounted on the motor and fan unit 3'. A second tube 47 provides an airway between the valve 45 and the motor 3 itself. The valve 45 for the piston assembly 48 is actuated by means of a valve actuator 44, which is also mounted on the cam rod 38 and is shown in FIG. 4.

The valve actuator 44 comprises a cylindrical member mounted concentrically with the rotational axis 43 of the cam rod 38. The cylindrical member has a face 66 which protrudes from the outer surface of the cylindrical member and extends around a portion of its circumference. The valve actuator 44 is arranged in a predetermined orientation with respect to the cams 37 and the microswitch actuator 43 on the cam rod 38. Thus, there is a relationship between the rotational position of the valve actuator 44 and the afore-described predetermined positions of the cams 37. The valve actuator 44 acts on the valve 45 to activate the piston assembly 48 when the cams 37 are in the positions corresponding to the lowest, and second-lowest positions of the brush bar 29, such as are shown in FIGS. 5c and 5d.

Figure 11:
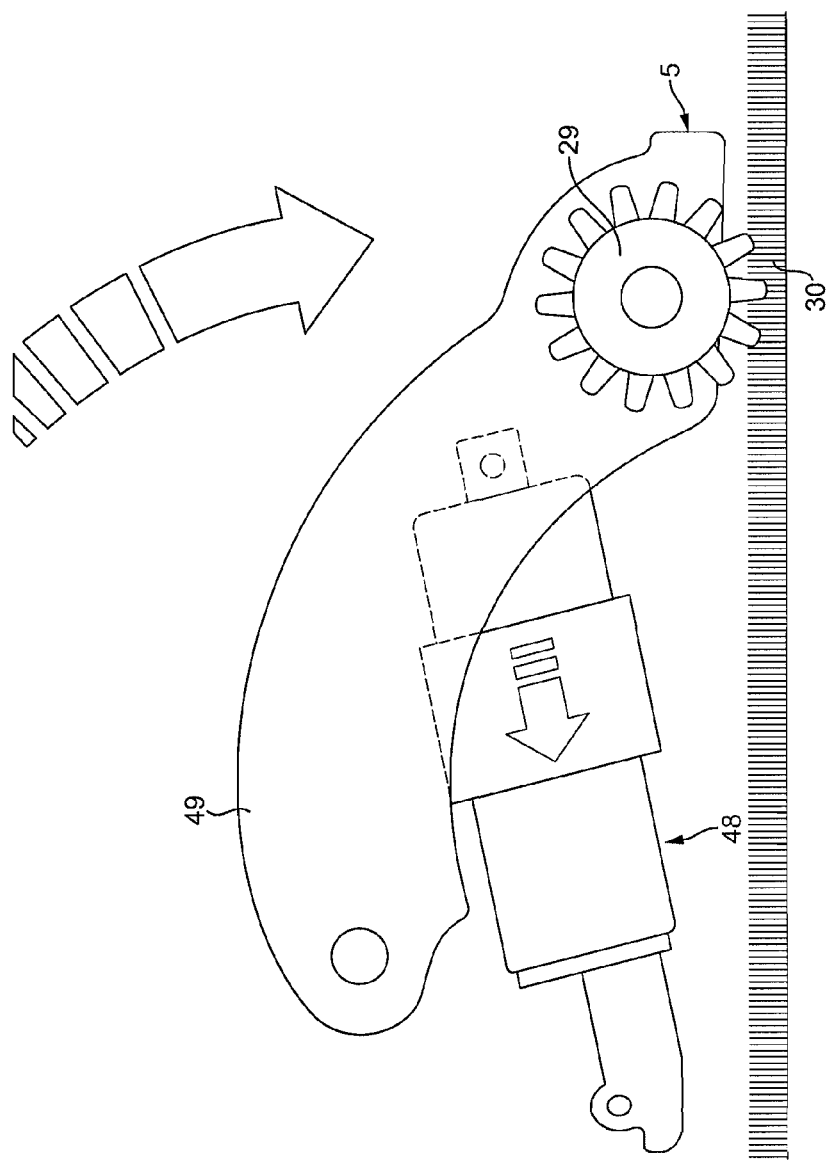
FIG. 11 is a sectional schematic side view of the head assembly, showing the piston assembly in its second position.

When the valve 45 is actuated by the valve actuator 44, a plunger inside the valve slides from a first position, in which no air flows through the valve, to an open position, in which the air can flow between the main motor 3 and the piston assembly 48 by means of the tubes 46, 47. Thus, when the valve 45 is actuated, the piston assembly 48 is subjected to a vacuum force from the main motor 3. The piston assembly 48 is caused to contract, with the piston 64 sliding inside the cylinder 63 to occupy the active position shown in FIG. 9c. The piston assembly 48 is attached to the cleaner head casing 49 and so, as the piston assembly contracts, the cleaner head assembly 5 including the brush bar housing 31 is subjected to a force that urges it towards the main body 2 of the vacuum cleaner 1. Due to the pivotal mounting of the cleaner head assembly 5 on the main body 2, the force is translated into a downwardly-directed motion, as is shown in FIG. 11. Hence, the brush bar housing 31 is urged downwards such that the brush bar 29 is driven deeper into the pile of the carpet.

Figure 12:
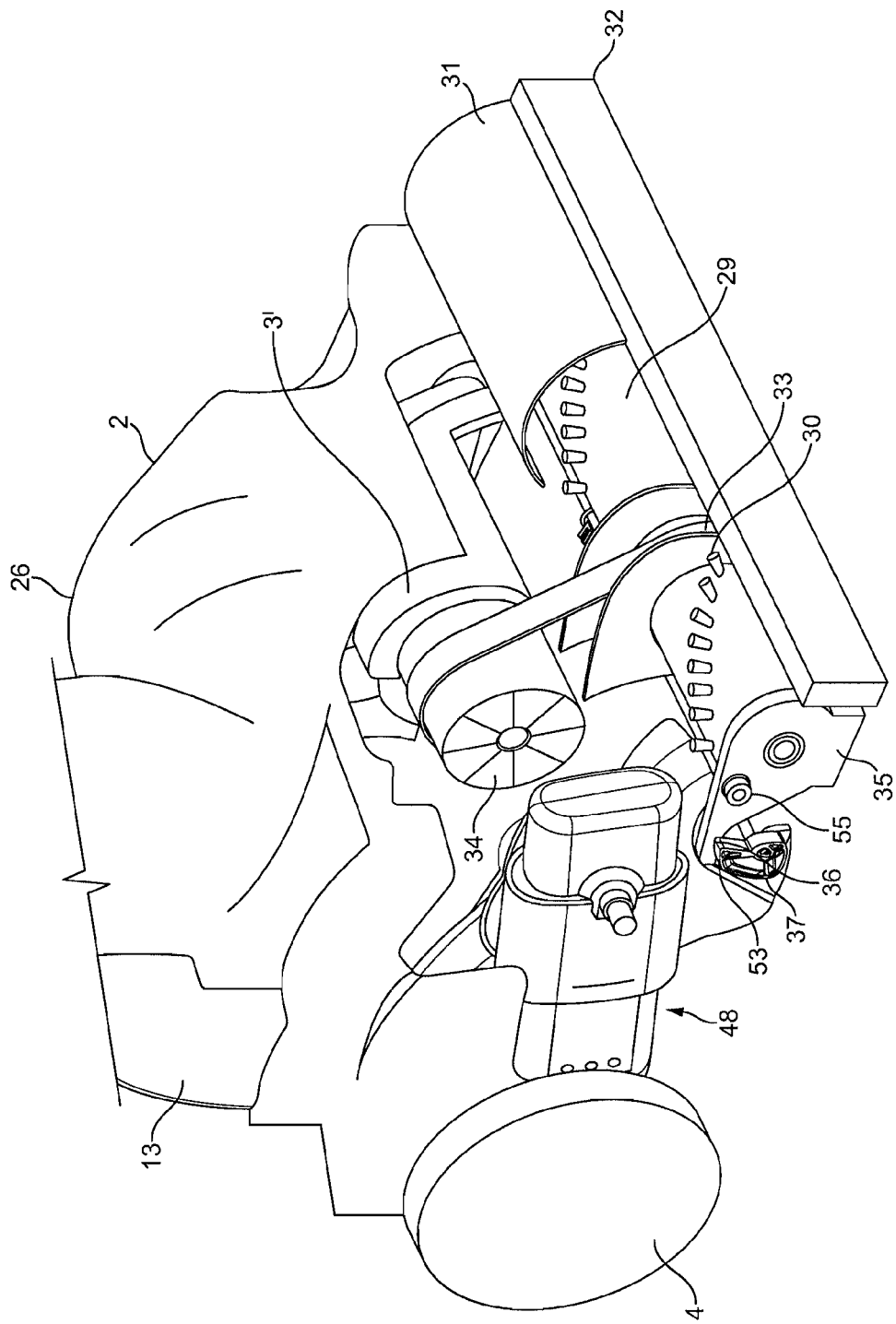
FIG. 12 is a perspective partly cut-away view of the head assembly, showing the agitator in its lowest position and the piston assembly in its second position.

FIG. 12 shows the afore-described components in operation in cleaning a deep-pile carpet. The fourth face 53 of the cam 37 bears against the lever arm 36 to lower the brush bar 29 into its lowest position with respect to the cleaner head assembly 5. The piston assembly 48 is activated so that the brush housing 31 is urged into the pile of the carpet.

If the user then moves the cleaner to a floor surface having a short pile or no pile, the user depresses the appropriate button 16, 17. The cam motor 40 rotates the cams 37 such that the brush bar 29 occupies a higher position and the face 66 of the valve actuator 44 no longer acts on the valve 45. A spring inside the valve 45 urges the slider back into the closed position, closing off the airway provided by the tubes 46, 47 so that the main motor 3 no longer applies a suction force to the piston assembly 48. Hence, the piston assembly 48 returns to its normal position of FIG. 9b, in which it no longer applies an appreciable downwards force to the brush housing 31. In its normal position, the piston assembly 48 is flexible and permits the cleaner head assembly 5 to move freely.

If the user moves from a deep or medium pile carpet to a short pile carpet or bare floor but forgets to select a different floor type, or inadvertently makes an incorrect selection, the runners 35a of each end cap come into effect. The runners 35a space the bristles 30 of the brush bar 29 from the base weave of the carpet to prevent damage to the carpet. The runners 35a can also help to prevent the clutch assembly 34 from disengaging, which typically occurs when the bristles 30 dig in to the base of the carpet. Similarly, if the user attempts to utilise the vacuum cleaner 1 on a bare floor with the brush bar 29 in one of the lower positions, the runners 35a space the bristles 30 from the floor to prevent scuffing of the bare floor surface.

The invention is not limited to the detailed description given above. Variations will be apparent to the person skilled in the art. For example, the agitator need not be a brush bar—it could comprise beaters or flicker strips. The invention has been described with reference to an agitator being driven by the main motor of the appliance, but it could have its own dedicated motor.

The cam control of the brush bar position, the electromechanical feedback system provided by the microswitch actuator and microswitch assembly, and the piston may each be independently utilised in any type of surface treating appliance.

The electromechanical feedback system need not comprise the microswitch assembly and microswitch actuator. An alternative mechanical actuator may be employed in conjunction with an different type of signalling means. For example, an actuator having protruding faces may be used in conjunction with optical sensors arranged to provide signals to the control circuitry. The control circuitry may comprise switches operated by plungers activated by the cam motor.

The brush housing may be continuously biased into a downwards position by means of, for example, springs, in which case the piston assembly may be arranged to provide an upwardly-directed force to the brush housing when the appliance is used to clean a bare floor or short pile carpet.

The cleaning appliance may be arranged automatically to detect the type of floor surface being cleaned, and to actuate the cams and piston assembly automatically in accordance with the floor surface. Thus, the user need not remember to select the appropriate button when moving from one type of floor surface to another. Alternatively, or additionally, an override mechanism may be provided so that the user can determine the extent of bristle penetration and the operation of the piston assembly.

The piston assembly has been described as having only a fully on or fully off state, but intermediate stages of deployment are possible.

The cams in the described embodiment are arranged to provide vertical positions of the brush bar that are equally spaced from one another. However, the shape of the cam may be arranged such that unequal spacing of the brush bar positions may be achieved.

The cam motor may be driven by a belt instead of the gear. Similarly, the brush bar may be rotatably driven by a gear system instead of the belt, or it may be driven directly by its own internal motor.

The separating apparatus need not be a cyclonic separator. Other forms of separating apparatus could be used, for example, a porous bag or filter. The cleaning appliance need not be an upright vacuum cleaner. The invention is applicable to other types of vacuum cleaner, for example, cylinder machines, stick-vacuums or hand-held cleaners. An agitator need not be included. Further, the present invention is applicable to other types of cleaning appliances, for example, a wet and dry machine or a carpet shampooer, and surface-treating appliances in general—such as polishing/waxing machines, pressure washing machines, ground marking machines and lawn mowers.

The invention claimed is:

1. A surface treating head assembly comprising:
a drivable agitator rotatably housed in a housing,
a motor arranged to be capable of driving a position-adjusting mechanism arranged to adjust the position of the agitator with respect to the housing, and
an electro-mechanical feedback arrangement for controlling operation of the motor,
wherein the electro-mechanical feedback arrangement comprises an actuator arranged to interact with a signalling system associated with control circuitry for the motor, and
wherein the position-adjusting mechanism comprises a cam, the cam and the actuator being rotatably drivable by the motor about a common axis.

2. An assembly as claimed in claim 1, in which the actuator is in communication with the mechanism arranged to adjust the position of the agitator.

3. An assembly as claimed in claim 1 or 2, in which the signalling system comprises a plurality of switches, each of which is arranged to be actuable by respective portions of the actuator.

4. An assembly as claimed in claim 1 or 2, in which the position-adjusting mechanism is arranged to adjust the position of the agitator to a plurality of predetermined vertical positions.

5. An assembly as claimed in claim 4, in which the electro-mechanical feedback arrangement adopts predetermined configurations associated with different ones of the predetermined vertical positions.

6. An assembly as claimed in claim 1 or 2, comprising a user-operable switch assembly to control energization of the motor.

7. An assembly as claimed in claim 1 or 2, in which the agitator comprises a brush bar.

8. A surface treating appliance comprising the surface treating head as claimed in claim 1 or 2.

9. A cyclonic vacuum cleaner, comprising the surface treating appliance as claimed in claim 8.

10. An assembly as claimed in claim 2, in which the signalling system comprises at least one switch arranged to be actuable by a portion of the actuator.

11. An assembly as claimed in claim 1, in which the signalling system comprises at least one switch arranged to be actuable by a portion of the actuator.

12. A surface treating head assembly comprising:
a drivable agitator rotatably housed in a housing,
a motor arranged to be capable of driving a position-adjusting mechanism arranged to adjust the position of the agitator with respect to the housing,
an electro-mechanical feedback arrangement for controlling operation of the motor, and
a user-operable switch assembly to control energization of the motor,
wherein the user-operable switch assembly comprises a plurality of user-operable buttons, each button corresponding to different predetermined positions of the agitator.

* * * * *